US011043048B2

(12) United States Patent
Mustonen et al.

(10) Patent No.: US 11,043,048 B2
(45) Date of Patent: Jun. 22, 2021

(54) METHOD FOR DIAGNOSIS AND/OR MAINTENANCE OF A TRANSPORTATION SYSTEM, AND SOFTWARE PROGRAM

(71) Applicant: Kone Corporation, Helsinki (FI)

(72) Inventors: Matti Mustonen, Helsinki (FI); Jouko Kinnari, Helsinki (FI)

(73) Assignee: Kone Corporation, Helsinki (FI)

( * ) Notice: Subject to any disclaimer, the term of this patent is extended or adjusted under 35 U.S.C. 154(b) by 92 days.

(21) Appl. No.: 16/203,801

(22) Filed: Nov. 29, 2018

(65) Prior Publication Data
US 2019/0206155 A1 Jul. 4, 2019

(30) Foreign Application Priority Data
Dec. 29, 2017 (EP) .................................... 17211142

(51) Int. Cl.
*G07C 5/08* (2006.01)
*B66B 5/00* (2006.01)
(Continued)

(52) U.S. Cl.
CPC .......... *G07C 5/0808* (2013.01); *B66B 5/0006* (2013.01); *B66B 5/0025* (2013.01);
(Continued)

(58) Field of Classification Search
CPC ........................... G07C 5/0808; B66B 5/0025
See application file for complete search history.

(56) References Cited

U.S. PATENT DOCUMENTS

| 6,330,936 B1 * | 12/2001 | Lence Barreiro | ..... B66B 5/0025 187/247 |
| 2003/0121730 A1 * | 7/2003 | Liu | ....................... B66B 5/0025 187/391 |

(Continued)

FOREIGN PATENT DOCUMENTS

| CN | 101151201 A | * | 3/2008 | ............. B66B 13/22 |
| JP | 2006143473 A | | 6/2006 | |

(Continued)

OTHER PUBLICATIONS

European Search Report Application No. 17211142.9 dated Aug. 16, 2018.

*Primary Examiner* — Charlie Y Peng
(74) *Attorney, Agent, or Firm* — Harness, Dickey & Pierce, P.L.C.

(57) ABSTRACT

A method for diagnosis and/or maintenance of a transportation system that has a transportation device and a remote monitoring unit, the transportation device having a control board for controlling and/or monitoring a function of said transportation device, and a local control unit for controlling said and/or monitoring said control board, may include detecting raw data associated with the function at the control board and/or the local control unit; generating condition information and/or performance information based on the raw data and calculating statistics information based on the generated information at the local control unit; buffering the generated information and/or statistics information at the local control unit; transmitting the buffered information to the remote monitoring unit; processing the transmitted information to determine a service need condition; and selectively transmitting maintenance information associated with the service need condition to the local control unit and/or a mobile service unit.

19 Claims, 3 Drawing Sheets

(51) Int. Cl.
*G07C 5/00* (2006.01)
*H04L 29/08* (2006.01)
(52) U.S. Cl.
CPC ............ *G07C 5/008* (2013.01); *G07C 5/085* (2013.01); *H04L 67/10* (2013.01)

(56) References Cited

U.S. PATENT DOCUMENTS

| | | | |
|---|---|---|---|
| 2004/0094366 A1* | 5/2004 | Weinberger | B66B 5/0025 187/247 |
| 2006/0144646 A1* | 7/2006 | Engel | B66B 5/0087 187/391 |
| 2011/0240414 A1* | 10/2011 | Carreno | B66B 5/0025 187/390 |
| 2015/0293799 A1 | 10/2015 | Sekine et al. | |
| 2017/0029244 A1* | 2/2017 | Madarasz | B66B 5/0037 |
| 2019/0010018 A1* | 1/2019 | Lovett | B66B 5/0006 |

FOREIGN PATENT DOCUMENTS

| | | |
|---|---|---|
| JP | 2012184087 A | 9/2012 |
| JP | 2014206864 A | 10/2014 |

* cited by examiner

METHOD FOR DIAGNOSIS AND/OR MAINTENANCE OF A TRANSPORTATION SYSTEM, AND SOFTWARE PROGRAM

CROSS-REFERENCE TO RELATED APPLICATION

This application claims priority to European Patent Application No. EP17211142.9 filed on Dec. 29, 2017, the entire contents of which are incorporated herein by reference.

BACKGROUND

The invention relates to a method for diagnosis and/or maintenance of a transportation system, and a software program.

Elevator control systems may consist of tens of control boards each having one or more processors and many sensors that can produce valuable information for Condition Based Maintenance (CBM). It is neither feasible nor valuable to send all the data processed in the system every 10 ms or the like, but some of the signals are valuable and provide good data for condition diagnosis and prognosis. Even by selecting the signals carefully it is not needed to see all the samples in second scale as typically the needed time for optimized maintenance is days/weeks.

SUMMARY

It is therefore an object of the present invention to minimize data amount (=connectivity price) between the device and the server where fleet analytics is done.

The object is solved by a method and a computer program product. Further developments and advantageous embodiments are defined in the dependent claims.

The invention starts out from the idea that data amount could be minimized if the data is processed at the device.

Accordingly, an aspect of the invention is a method for diagnosis and/or maintenance of a transportation system, said transportation system having at least one transportation device and a remote monitoring unit being remote from said transportation device, said transportation device having a control board for controlling and/or monitoring a function of said transportation device, and a local control unit for controlling said and/or monitoring said control board. The method comprises:

detecting raw data connected to said at least one function at said control board and/or said local control unit;
generating condition information and/or performance information based on said raw data at said control board and/or said local control unit;
calculating statistics information based on said condition information and/or performance information at said local control unit;
buffering said condition information and/or performance information and/or statistics information at said local control unit;
transmitting said condition information and/or performance information and/or statistics information to said remote monitoring unit, at predetermined and/or adaptive time intervals;
processing said condition information and/or performance information and/or statistics information at said remote monitoring unit, for establishing a service need condition; and
transmitting said service need condition selectively to the local control unit and/or a mobile service unit.

The method may further comprise
managing a database holding data related to said condition information and/or performance information at said local control unit.

In the aforementioned method, said control board may be implemented as a LON or drive node, and may communicate with the local control unit via LON or drive interfaces. Furthermore, said local control unit may communicates with the remote monitoring unit via SAG interfaces. The aforementioned protocols are widely used in elevator control. However, other protocols such as mobile (wireless) or wired other (PSTN, LAN) network protocols may be employed as needed or usual.

In the aforementioned method, said the maintenance information may be indicative of a certain kind and/or severity of failure or problem of the frequency converter. Other sources/targets than a frequency convertor are possible.

In the aforementioned method, said the established maintenance information may be transferred or made accessible to a remote maintenance center or a mobile service unit or the local control unit of the transportation device, depending on a kind and/or severity of failure or problem indicated by the maintenance information.

In the aforementioned method, motor current and motor voltage of an automatic door motor may be detected as said raw data, and a door friction may be generated as a performance information.

In the aforementioned method, said performance information may be buffered separately for each door on each floor of said transportation device.

In the aforementioned method, said statistics information may be calculated and buffered separately for each door on each floor of said transportation device.

In the aforementioned method, said transportation device may be selected from one of an elevator, an escalator, a moving walkway, a cablecar, a railway locomotive, a railcar, a roller coaster, a conveyor, a crane, a positioning unit, and combined systems of a plurality of single units of the same.

The method may further comprise generating, by the mobile control unit
for the remote monitoring unit a request to retrieve condition information and/or performance information associated with a specific service need condition from the buffer at the local control unit. Based on the generated request, the mobile control unit may receive from the remote monitoring unit the condition information and/or performance information associated with a specific service need condition. This can mean that when a serviceman has performed a maintenance action related to the service need condition in question he/she may verify that the transportation system is in working order by studying the latest buffered condition information and/or performance information received from the remote monitoring unit. For example, to get a quick understanding that door operator is in wording order after performed maintenance action he/she may study a sequence of latest associated door operator KPIs before leaving elevator site.

Another aspect of the invention is a software program realizing the method according to any of the preceding claims when executed on a computer. In the aforementioned software program wherein the computer is preferably a distributed computing system part of which being located in a cloud computing system. The software program may be embodied as a computer program product or a data carrier carrying data representing the software program.

BRIEF DESCRIPTION OF THE DRAWINGS

Other aspects, features and advantages of the invention will become apparent by the below description of exemplary embodiments alone or in cooperation with the appended drawings.

DETAILED DESCRIPTION

Now, exemplary embodiments of the invention will be described in further detail.

Figure 1:
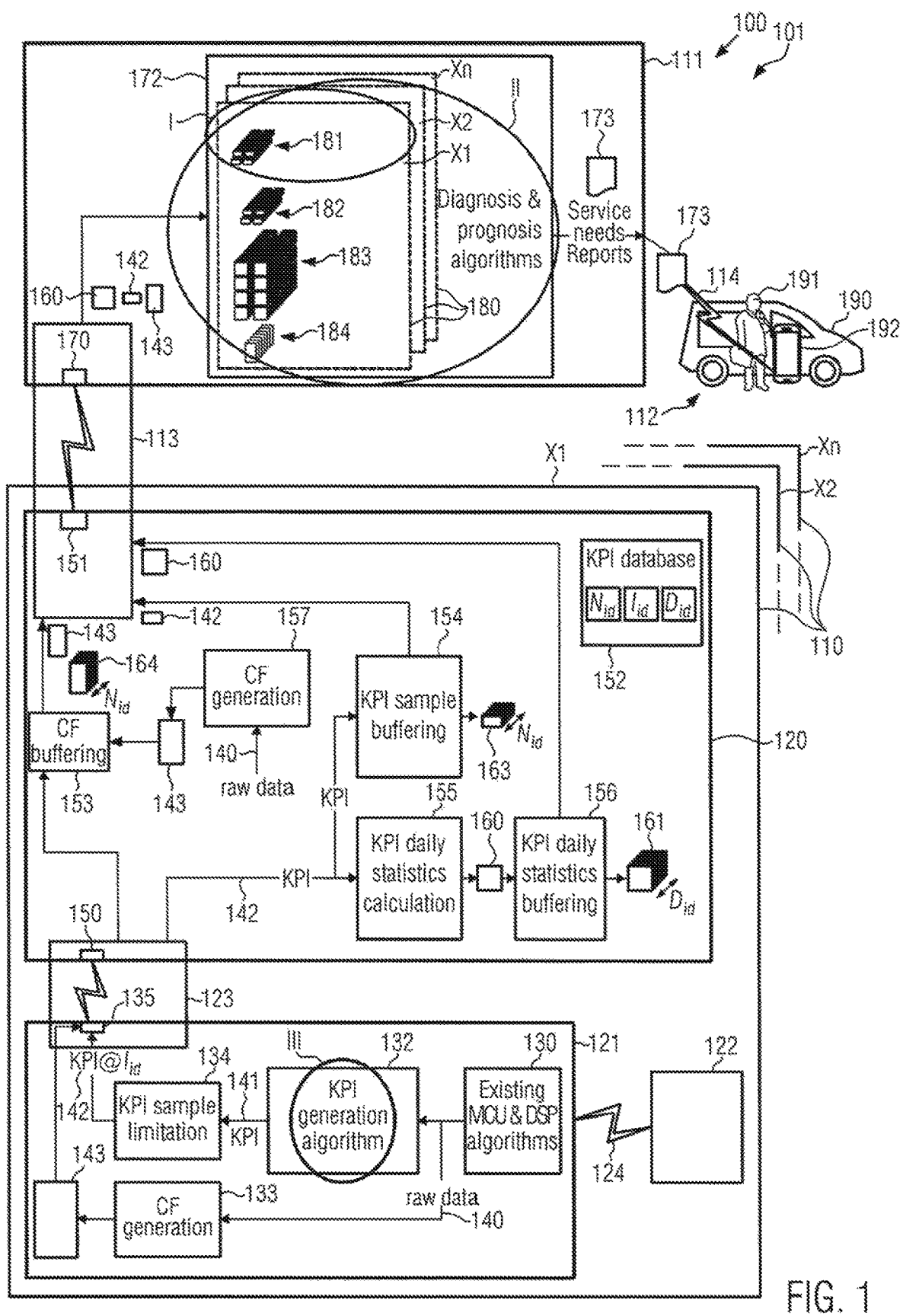
FIG. 1 is a schematic diagram of a diagnosis/maintenance system or method according to an exemplary embodiment of the invention.

FIG. 1 is a schematic diagram of a diagnosis/maintenance system 100 or method 101 according to an exemplary embodiment of the invention. It will be noted that elements shown in FIG. 1 may be realized as physical instances of the diagnosis/maintenance system 100, or steps of the diagnosis/maintenance method 101, or both.

The system 100 or method 101 is for diagnosis/maintenance of an elevator 110. There may be only one elevator in the system, but there may also be a multiplicity of elevators 110. For distinguishing elevators 110 from each other, each elevator 110 is designated a unique number, herein exemplified as X1, X2, . . . , Xn. In other words, there are n elevators 110 in the system, with n being 1, 2, or more.

A remote monitoring unit 111 is for monitoring each elevator 110 through diagnosis and prognosis algorithms which will be described later, and is in contact with a service unit 112. Even if only one service unit 112 is shown, more than one service unit 112 may be present. A device link 113 is for communication between the remote monitoring unit 111 and the elevator(s) 110, and a service link 114 is for communication between the remote monitoring unit 111 and the service unit(s) 112.

Each elevator 110 comprises a local control unit 120, a drive control board 121, and a motor drive 122 controlled by the drive control board 121, for moving an elevator car or cabin (not shown). A control link 123 is for communication between the local control unit 120 and the drive control board 121, and a drive link 124 is for connecting the drive control board 121 with the motor drive 122. The motor drive 122 may e.g. be a frequency converter converting three-phase mains voltage/current into three-phase motor voltage/current of a hoisting motor of the elevator 110, under control of the drive control board 121. Even if only one drive control board 121 and one motor drive 122 are shown, an elevator may have more than one cars, and a car may have one or more hoisting motors. So each car may be assigned one or more motor drives 122, and each motor drive 122 is assigned to one drive control board 121. However, one drive control board 121 may be responsible for one or more motor drives 122 of one or more elevator cars. Individual elevators may have other control boards also. These control boards may be connected to local control unit 12 via a common LON data bus, for example. These control boards may include car control board disposed on elevator car and landing control boards disposed on separate landings.

In this exemplary embodiment, the service link 114 is based on a mobile communications protocol, the device link 113 is based on SAG, wherein any other wireless or wired communication protocol is possible, the control link 123 is based on LON or device protocol, and the drive link 124 is based on a KDSC, which is a Kone-specific drive protocol to interface with commercial drives. Alternatively, the protocol could be made of or comprise control pulses if IGBT transistors of a motor drive are used. Generally, any protocol, particularly serial communication protocol, is possible. It will be noted that any other useful protocol may be used as needed.

The drive control board 121 comprises a drive control 130 for executing MCU and DSP algorithms which per se are known in the art, for driving switches of the motor drive 122, a KPI generation 132, a CF generation 133, a KPI sample limitation 134, and an uplink interface 135 of the control link 123.

There are many signals calculated in the motion control and torque control algorithms located in the drive control 130. The drive control 130 therefore does see and handle many control values as it is controlling the motion of the hoisting machine and these signals can be used to evaluate condition of many system components. Many of these values are calculated either in real-time or after each travel and thus there would be lots of data generated if the values should be transferred to a remote server for analysis and maintenance purposes. A diagnostics framework has been developed to reduce data sent to a server and this framework shall be extended to a drive software as well. This specification describes what data is generated in a box marked with circles I, II, III for condition-based maintenance (CBM) purposes.

The signals calculated detected or generated in the drive control 130 are passed, as a plurality of raw data 140, to the KPI generation 132 and CF generation 133. The KPI generation 132 has algorithms which generate so-called "Key Performance Indicators" (KPI) 141 from the raw data 140, and the CF generation 133 has algorithms which generate so-called "Condition files" (CF) 143 from the raw data 140. A KPI 141 may have the following structure:

<KPI Sample 141>
1) timestamp
2) sample

A condition file 143 may have the following structure:
<Condition File (CF) 143>
header (timestamp, source)
data1, data2
2,123,134.345
2,278,127.780
. . . .

It will be noted that numerical values in the condition file 143 above have no particular meaning in the context of the present invention and are purely by example. The condition file 143 is condition information in the sense of the invention, and the KPI sample 141/142 is a performance information in the sense of the invention. Here, both KPIs and CFs can be used as condition and performance signals.

The condition files 143 are directly passed to the uplink interface 135 to be communicated to the local control unit 120, such as an elevator control unit. The KPIs 141 are passed to the KPI sample limitation 134 to generate a limited or selected KPI sample collection ($KPI@I_{id}$) 142 of the individual drive control board 121. The selected KPI samples 142 are then passed to the uplink interface 135 to be communicated to the local control unit 120.

The local control unit 120 has a downlink interface 150 of the control link 123, an uplink interface 151 of the device link 113, a KPI database 152, a CF buffering 153, a KPI sample buffering 154, a KPI daily statistics calculation 155, a KPI daily statistics buffering 156, and a CF generation 157. The local control unit 120 can produce KPIs also ("KPI generation algorithm").

The downlink interface 150 is for exchanging data with the drive control board 121, via the control link 123. The uplink interface 151 is for exchanging data with the remote monitoring unit 111, via the device link 113.

The KPI database 152 is for storing individual KPI samples 141 or KPI collections 142. The KPI database 152 may include a data structure including structured data relating to KPI samples and/or statistics, a memory area provided at the local control unit 120 for storing such data structure, and/or a process performing a database management method for managing such data structure.

The CF buffering 153 is for buffering condition files 143 passed from the drive control board 121 and other condition files 143 generated at the local control unit 120 itself, in a condition file stack 164, and passing the same to the uplink interface 151.

The KPI sample buffering 154 is for buffering selected KPI samples 142 passed from the drive control board 121 in a KPI sample stack 163, and passing the same to the uplink interface 151.

The KPI daily statistics calculation 155 is for calculating daily statistics files 160 from the selected KPI samples 142 passed from the drive control board 121, and passing the same to the KPI daily statistics buffering 156. A KPI daily statistics file 160 may have the following structure:

<KPI Daily Statistics File>
1) timestamp
2) minimum
3) maximum
4) average
5) standard deviation
6) amount of samples The KPI daily statistics buffering 156 is for buffering KPI daily statistics files 160 calculated in the KPI daily statistics calculation 155, in a KPI daily statistics stack 161 and passing the same to the uplink interface 151. The KPI daily statistics files 160 are statistics information in the sense of the invention. It will be noted that also CF daily statistics files (not shown) may contribute to statistics information in the sense of the invention.

The CF generation 157 is for generating further condition files 143 from raw data 140 handled within local control unit 120. The generated condition files 143 are also passed to CF buffering 153 to be processed as described above.

The remote monitoring unit 111 has a downlink interface 170 of the device link 113, a diagnosis and prognosis 172, and an interface (not shown) of the service link 114. The diagnosis and prognosis 172 receives selected KPI samples 142, condition files 143 and KPI daily statistics files 160 from the downlink interface 170, to be provided at device images 180 which are provided for each single elevator 110 identified by each one's respective unique number X1, X2, . . . , Xn. The selected KPI samples 142 are gathered at the KPI daily statistics stack 161 and/or at the KPI sample stack 163. The latest KPI samples 142 can be fetched without being stacked. Each device image 180 includes an events and statistics history 181, a KPI history 182, a KPI statistics history 183, and a raw data history 184. It is seen that also raw data 140 may be passed via the links 123, 113 to the remote monitoring unit 111, even if not shown in the drawing. The diagnosis and prognosis section 172 has diagnosis and prognosis algorithms which apply diagnosis and prognosis processes to each device image's 180 data for generating a service needs report 173 relating to an elevator 110 if the diagnosis and prognosis processes conclude that a service is needed at the respective elevator 110. The service needs report 173 is then passed to the mobile service unit 112 via service link 114. Also, service visits at elevator sites (maintenance modules) may be scheduled and work tasks to be performed during the service visits may be selected at least partly based on diagnosis and prognosis processes.

The service unit 112 may comprise a service car 190 operated by a serviceman 191, and comprises a communication device 192 such as a cellphone, car phone, smartphone, tablet, or the like. The service link 114 is established between the remote monitoring unit 111 and the communication device 192 of the service unit. If the service needs report 173 is received at the communication device 192, an alert is given so that the serviceman 191 will take notice, read the service needs report 173, and execute the service need at the elevator 110 the service needs report 173 directs to.

It will be noted that any measured/determined parameters related to drive control of a motor drive 122 of a hoisting motor (not shown) of the elevator 110 may be raw data 140, and a wide variety of parameters may be derived therefrom as key performance indicator (KPI) sample 141/142 or condition file 143. Accordingly, any KPI samples 141/142 and any condition file 143 may be further processed as described above. In other words, daily statistics 160 may be generated, history data 181-184 may be collected to provide an image of each elevator 110 in the system, and diagnosis and prognosis algorithms may be applied, to generate a service need report 173 if a problem is predicted to likely occur soon.

It will be noted that no additional hardware is needed for these estimations but the condition files 143 and/or KPI samples 141/142 can be determined (estimated) using existing hardware. Already with existing software, several drive signals may be derived which may be useful as raw data 140. The determined value(s) can be delivered to a data center (remote monitoring unit 111) and used in a Condition Based (aka predictive) Maintenance (CBM) to optimize replacement and maintenance intervals so that full lifetime is used and no functional failures shall occur.

The remote monitoring unit 111 may be included in a cloud computing architecture or other distributed architecture. I.e., at least parts of diagnosis and prognosis 172 may be distributed, e.g., to a data analysis platform and a maintenance unit located at different computers in a cloud. The KPI daily statistics data 160 are sent e.g. on a daily basis to the data analysis platform which in turn generates trend information. Trend information may be generated such that a decreasing or increasing trend can be detected and a maintenance action can be triggered before failure of the elevator or any part of it takes place, which would prevent elevator operation. To this end, trend information may be sent to the maintenance unit for analyzation. If the maintenance unit detects that a maintenance action is needed, it generates either a maintenance instruction and passes it to the local control unit 120 in case maintenance can be executed by useful control signaling to the drive control 130 or others, or generates a service needs report 173 and passes it to service unit 112 as described above. In the present case, the service needs report 173 may contain useful information for the serviceman 191 regarding the location of the elevator 110 (X1, X2, . . . , Xn) and the kind and severity of the problem, optionally along with a service proposal or precise service instruction. Additional information on the data basis (related signals) may be made available on the telecommunication device 192, e.g. by providing a direct link to the KPI database 152 or device image 180.

In this manner, any parameter may be utilized for establishing a maintenance information indicating that a maintenance should be done on the transportation device (elevator) 110.

Figure 2:
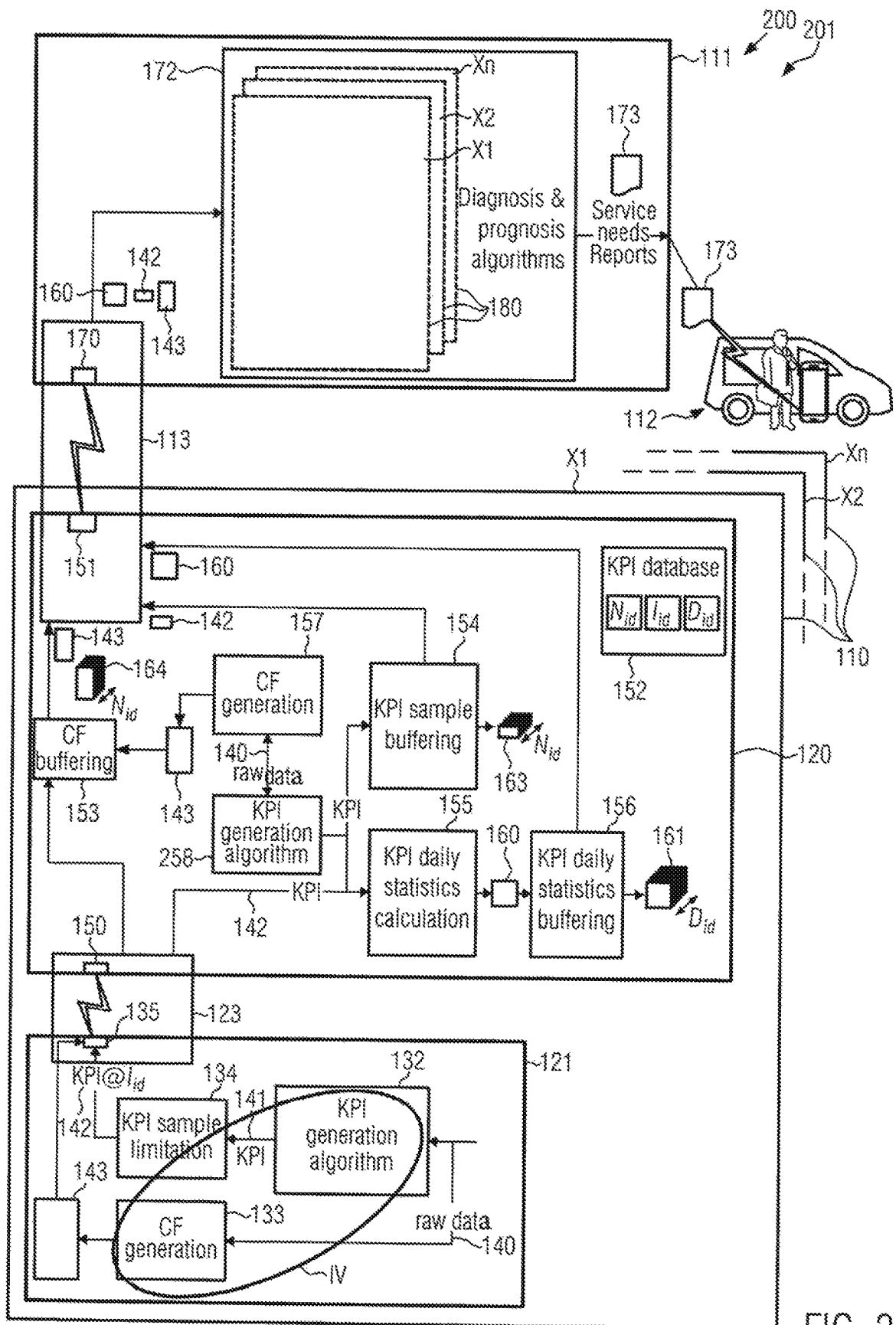
FIG. 2 is a schematic diagram of a diagnosis/maintenance system or method according to another exemplary embodiment of the invention.

FIG. 2 is a schematic diagram of a diagnosis/maintenance system 200 or method 201 according to an exemplary embodiment of the invention. It will further be noted that the diagnosis/maintenance system 200 or method 201 of this exemplary embodiment is a variation of the diagnosis/maintenance system 100 or diagnosis/maintenance method 101 of the previous exemplary embodiment. In the following, only differences or special options of this exemplary embodiment with respect to the previous exemplary embodiment are described in full while other features may be taken from the illustration and above description of the previous exemplary embodiment. In particular, any features shown and described in the context of the previous exemplary embodiment apply to this exemplary embodiment, and features shown and described in the context of this exemplary embodiment may be included in the previous exemplary embodiment. As above, elements shown in FIG. 2 may be realized as physical instances of the diagnosis/maintenance system, or steps of the diagnosis/maintenance method, or both. Contents of the device images 180 are omitted in this figure, for ease of illustration.

While the previous exemplary embodiment is focused on a drive control board 121 with drive control 130 for controlling a motor drive 122 of a hoisting motor (not shown), the control board 121 of the present exemplary embodiment is more general. I.e., the control board 121 may concern any function of the elevator 110.

This makes clear that any measured/determined parameters of any controlled function of the elevator 110 may be raw data 140, and a wide variety of parameters may be derived therefrom as key performance indicator (KPI) sample 141/142 or condition file 143. Accordingly, any KPI samples 141/142 and any condition file 143 may be further processed as described above. In other words, daily statistics 160 may be generated, history data 181-184 may be collected to provide an image of each elevator 110 in the system, and diagnosis and prognosis algorithms may be applied, to generate a service need report 173 if a problem is predicted to likely occur soon.

Furthermore, in this embodiment, the local control unit 120 additionally comprises a KPI generation 258 which is formed like the KPI generation 132 of the control board 121. This makes clear that KPI samples 141/142, just like condition files 143, may be generated at any place within the elevator 110, be it at the local control unit 120 or any of the many control boards 121.

Figure 3:
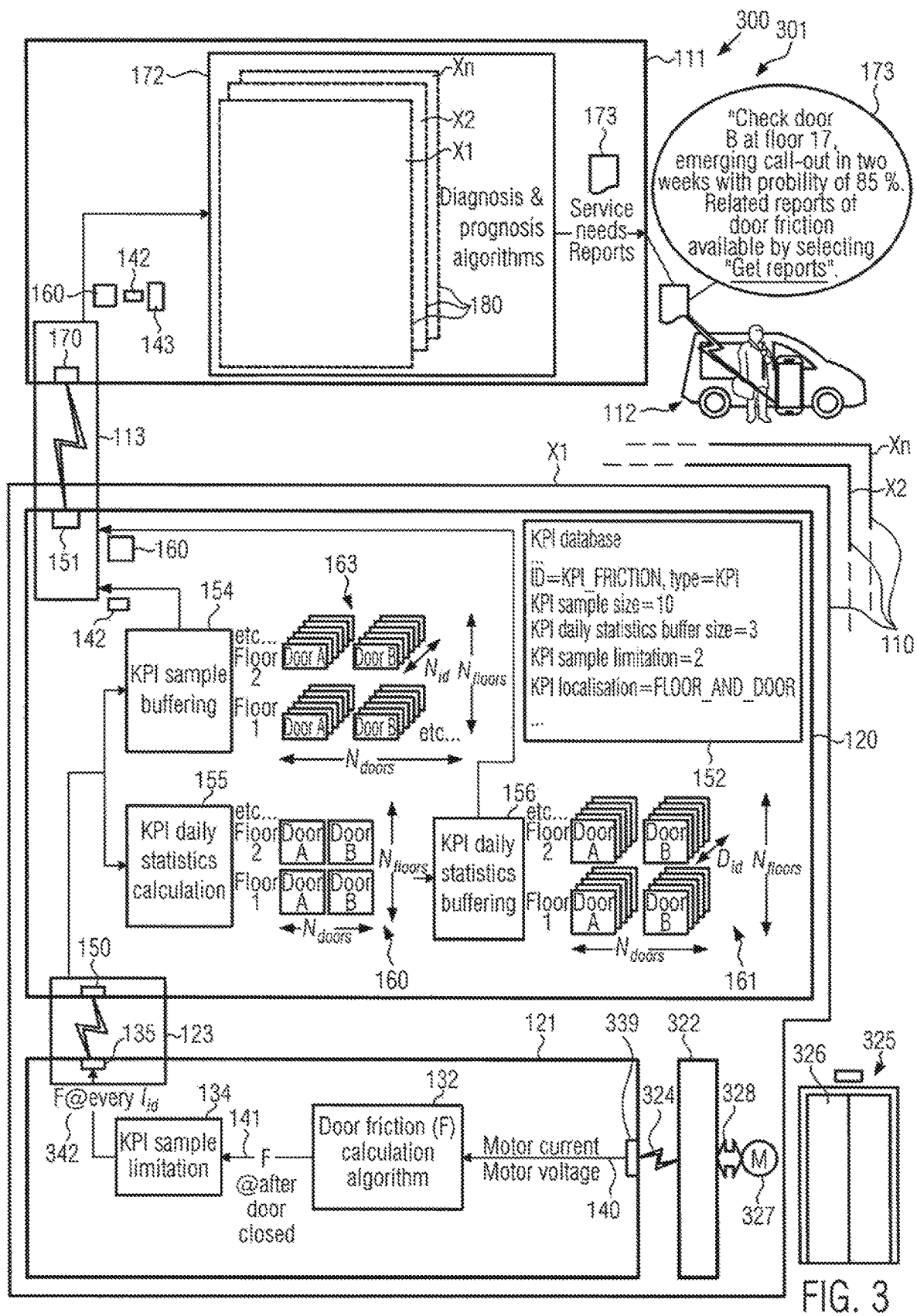
FIG. 3 is a schematic diagram of a diagnosis/maintenance system or method according to another exemplary embodiment of the invention.

The KPI attributes in KPI database 152 may have the following form:

<KPI Attributes/Database>
$1^{st}$ Handle
$1^{st}$ KPI ID+type (KPI/CF)
$1^{st}$ KPI sample/CF buffer size
$1^{st}$ KPI daily statistics buffer size
$1^{st}$ KPI sample limitation
$1^{st}$ KPI source
$2^{nd}$ Handle
$2^{nd}$ KPI ID+type (KPI/CF)
$2^{nd}$ KPI sample/CF buffer size
$2^{nd}$ KPI daily statistics buffer size
$2^{nd}$ KPI sample limitation
$2^{nd}$ KPI source
etc. . . .
NULL=next unused handle FIG. 3 is a schematic diagram of a diagnosis/maintenance system 300 or method 301 according to an exemplary embodiment of the invention. It will further be noted that the diagnosis/maintenance system 300 or method 301 of this exemplary embodiment is a variation of the diagnosis/maintenance system 200 or diagnosis/maintenance method 201 of the previous exemplary embodiment. In the following, only differences or special options of this exemplary embodiment with respect to the previous exemplary embodiment are described in full while other features may be taken from the illustration and above description of the previous exemplary embodiment. In particular, any features shown and described in the context of the previous exemplary embodiment apply to this exemplary embodiment, and features shown and described in the context of this exemplary embodiment may be included in the previous exemplary embodiment. As above, elements shown in FIG. 3 may be realized as physical instances of the diagnosis/maintenance system, or steps of the diagnosis/maintenance method, or both. Contents of the device images 180 are again omitted in this figure, for ease of illustration.

While the previous exemplary embodiment is more general, the present exemplary embodiment is focused on a specific example. A car door 326 is operated by the "Door operator" which has an electrical motor 327 that moves the door panels in the car when the elevator 110 lands to a floor 325 and the door 326 is opened. Some (but not all) failure modes of the door 326 lead to an increase in the friction F of the door, as the door 326 is being moved. As the increased friction F can be extracted from the electrical signals (motor current, motor voltage) produced by the drive 322 controlling the motor 327 via door motor link 328, which may be in the form of power cables, as raw data 140, it is possible to calculate a KPI 141 called "friction (F)", e.g., a door friction "F@after door closed", then after KPI sample limitation 134 a KPI sample collection "F@every $I_{id}$" 142 is provided, and by using the framework, this KPI 141/142 is further processed at the elevator 110 (local control unit 120) and the server (remote monitoring unit 111). Here, if a service need is foreseen, a service needs report 173 may be generated which may e.g. have the content seen in FIG. 3.

As the server algorithm 172 can utilize the whole fleet (i.e. all the elevators X1, X2, . . . , Xn under service that has the framework available) information, more precise prediction models can be developed and elevator specific KPIs 141/142 can be used to generate a service need which prevents call-out or optimizes service needs. As there are typically many doors and floors in an elevator, the KPI 141/142 are buffered for each floor 325 and door 326 in order to localize the fault correctly, as shown in FIG. 3. Likewise, KPI daily statistics are calculated and buffered for each floor 325 and door 326. The KPI database 152 may assume the form as seen in FIG. 3.

For example, a metro station in India with two landings is taken. There are hundreds or thousands door friction estimate condition KPI samples 141 every day which are processed in the elevator 110 to five figures (minimum, maximum, average, standard deviation and sample count) every 24 hours and sent to the server 111 for fleet/device analytics. The Diagnostics Framework utilizes existing communication network in the elevator 110 and can be thus implemented with the software only. The Diagnostics Framework can be extended in the future by adding new sensor boards to the existing LON network. The Diagnostics Framework, which may be in the form of the elevator's internal communication network, includes also algorithms to collect samples from signals in the drive using a "datalogger", which may be the CF. Similar framework can be built into escalators and automatic doors or any other kind of transportation device.

Advantageously, condition data can be produced in a control board in the elevator system utilizing existing communication networks, the data is "zipped" to reduce connectivity costs, and the framework can be extended in the future to support coming diagnostics solutions and new sensor boards.

In summary, the condition diagnostics framework consists of two parts, the elevator and the server side. The elevator side includes:
- KPI generation algorithms 132, 258 that produce wanted KPI samples 141/142 from raw data 140. These algorithms can be located either on the local control unit/board 120 (258) or on a LON node/drive control board 121 (132) connected to the local control unit 120
- KPI daily statistics calculation 155
- KPI buffering 154 to get recent KPI values, not just the daily statistics
- CF generation 133, 157 either on the local control unit/board 120 (258) or on a LON node/drive control board 121 (132) connected to the local control unit 120, and CF buffering 153 in the local control unit/board 120.
- KPI database 152 which holds KPI/CF related information The server side includes:
- Diagnosis and prognosis algorithms 172 that generate service needs and reports 173 to the service technician 191

In addition, the internal communication links in the elevator 110 (LON interface and drive interface) and the communication between the elevator and the server (SAG interface) are needed to get data to the server.

It will easily be seen that a similar monitoring system may be utilized for analysis of other data also. There are many signals calculated in the motion control and torque control algorithms located in the drive. A frequency converter's software e.g. sees many control values as it is controlling the motion of the hoisting machine and these signals can be used to evaluate a condition of many system components. Many of these values are calculated either in real-time or after each travel and thus there would be lots of data generated if the values should be transferred to the server for analysis purposes. A diagnostics framework has been developed to reduce data sent to a server and this framework is extended to drive software as well. Many data may be generated in KPI generation 132 for condition based maintenance purposes. This is shortly discussed in the following.

<Motor Temperature>

The temperature [° C.] of the hoisting motor may be low-pass filtered and handled as a condition KPI. This could be used to estimate the condition of the cooling system of the hoisting motor as the dirt reduces heat transfer capacity.

Drive software measures the temperature of hoisting motor when the motor is equipped with NTC temperature measurement sensors This value may be transferred to local control unit 120 via control link 123 utilizing diagnostics framework routine for KPI transfer after the drive has switched to non-running state (output power stage not active).

It is to be considered that a load profile may change over the time and hard to separate cooling system condition from normal variation.

It is seen from the above that considerable amount of data may be collected from elevators or other transportation systems 110 under maintenance contract, sent to a cloud computing system 111 and analyzed. On the basis of the analysis, need for component replace is forecasted and corresponding maintenance actions 173 are scheduled already before any component failures, which might stop elevator operation. So a more fluent and customer-friendly elevator diagnosis/maintenance user experience is achieved.

Even if the invention was described above based on elevators, as a matter of example, the invention is applicable to any transportation system using an electric motor for moving a moving part of the transportation system. The moving part may be a cabin of an elevator, a car of a roller coaster, a moving stairway or walkway, a locomotive of a railway, or others.

It is to be noted that the monitoring interval may be other than daily, i.e., may be shorter such as twice daily, hourly, or less such as even after every run, or may be longer such as twice weekly, weekly, monthly, or more.

A technical feature or several technical features which has/have been disclosed with respect to a single or several embodiments discussed herein before, e.g. the service car 190 in FIG. 1 may be present also in another embodiment e.g. when maintenance is carried out by using mechanical brake signals as a condition/performance information except it is/they are specified not to be present or it is impossible for it/them to be present for technical reasons.

LIST OF REFERENCE SIGNS

100 Diagnosis/maintenance system
101 Diagnosis/maintenance method
110 Transportation device (e.g., elevator)
111 Remote monitoring unit (cloud computing system)
112 Service unit
113 Device link
114 Service link
120 Local control unit
121 Drive control board
122 Motor drive (frequency converter)
123 Control link
124 Drive link
130 Drive control (Existing MCU & DSP algorithms)
132 KPI generation
133 CF generation
134 KPI sample limitation
135 Uplink interface
140 Raw data
141 Key performance indicator (KPI)
142 KPI sample
143 Condition file (CF)
150 Downlink interface
151 Uplink interface
152 KPI database
153 CF buffering
154 KPI sample buffering
155 KPI daily statistics calculation
156 KPI daily statistics buffering
157 CF generation
160 KPI daily statistics file
161 KPI daily statistics stack
163 KPI sample stack
164 CF stack
170 Downlink interface
171 Communication link
172 Diagnosis & prognosis 173 Service needs report
180 Device images
181 Events & statistics history
182 KPI history
183 KPI statistics history
184 Raw data history
190 Service car
191 Serviceman
192 Communication device
200 Diagnosis/maintenance system
201 Diagnosis/maintenance method
258 KPI generation algorithm
300 Diagnosis/maintenance system
301 Diagnosis/maintenance method
322 Door drive
324 Door motor drive link
325 Floor
326 Door
327 Door motor
328 Door motor link
339 Downlink interface
F Door friction
KPI Key performance indicator
X1, X2, Xn Elevators (transportation devices)

The invention claimed is:

1. A method for diagnosis and/or maintenance of a transportation system, said transportation system including a transportation device and a remote monitoring device, the remote monitoring device remote from the transportation device, the transportation device including a control board and a local control device, the control board configured to control and/or monitor a function of said transportation device, the local control device configured to control and/or monitor the control board, the method comprising:
 detecting raw data at the control board and/or the local control device, the raw data associated with the function;
 generating condition information and/or performance information based on the raw data at the control board and/or the local control device;
 calculating statistics information based on the condition information and/or performance information at the local control device;
 buffering at least the statistics information at the local control device;
 transmitting at least the statistics information to the remote monitoring device, at a particular time interval;
 processing at least the statistics information at said remote monitoring device to generate trend information based on the statistics information and to determine a service need condition associated with the transportation system based on detection of a trend indicated by the trend information, including determining at said remote monitoring device that a maintenance action is needed to perform maintenance on the transportation device; and
 selectively transmitting maintenance information associated with the service need condition to the local control device and/or a mobile service device in response to the determining the service need condition, including the determining at said remote monitoring device that the maintenance action is needed to perform maintenance on the transportation device.

2. The method of claim 1, further comprising:
 managing a database at the local control device, the database storing data associated with the condition information and/or performance information.

3. The method of claim 1, wherein
 the control board is connected to a main control board via an internal communication link, and
 the control board is
  implemented as a LON node and is configured to communicate with the local control device via LON interfaces, or
  implemented as a drive node and is configured to communicate with the local control device via drive interfaces.

4. The method of claim 1, wherein the local control device is configured to communicate with the remote monitoring device via
 SAG interfaces,
 wireless interfaces, or
 wired interfaces.

5. The method of claim 1, wherein the maintenance information indicates a particular kind and/or severity of failure or problem associated with a component of the transportation system.

6. The method of claim 5, further comprising:
 transferring the maintenance information or making the maintenance information accessible to a remote maintenance center, the mobile service device, or the local control device of the transportation device, based on the particular kind and/or severity of failure or problem indicated by the maintenance information.

7. The method of claim 1, wherein the transportation device is selected from one of
 an elevator,
 an escalator,
 a moving walkway,
 a cablecar,
 a railway locomotive,
 a railcar,
 a roller coaster,
 a conveyor,
 a crane,
 a positioning device, and
 a combination thereof.

8. The method of claim 1, further comprising:
 generating, at the mobile service device, a request to the remote monitoring device to retrieve specific condition information and/or performance information from a buffer at the local control device, the specific condition information and/or performance information associated with a specific service need condition; and
 receiving, at the mobile service device, the specific condition information and/or performance information from the remote monitoring device.

9. A data carrier carrying data representing a software program that, when executed on a computer, realizes the method according to claim 1.

10. The data carrier of claim 9, wherein the computer is a distributed computing system part of a cloud computing system.

11. A method for diagnosis and/or maintenance of a transportation system, said transportation system including a transportation device and a remote monitoring device, the remote monitoring device remote from the transportation device, the transportation device including a control board, and a local control device, the transportation device including an elevator that includes a plurality of doors at separate, respective floors of a plurality of floors, the control board configured to control and/or monitor a function of said transportation device, the local control device configured to control and/or monitor the control board, the method comprising:
- detecting raw data at the control board and/or the local control device, the raw data associated with the function;
- generating condition information and performance information based on the raw data at the control board and/or the local control device;
- calculating statistics information based on the condition information and/or performance information at the local control device, wherein the statistics information is calculated separately for each door on each floor of the transportation device;
- buffering the condition information, performance information, and statistics information at the local control device, wherein the performance information is buffered separately for each door on each floor of the transportation device, wherein the statistics information is buffered separately for each door on each floor of the transportation device;
- transmitting, at the local control device, the buffered performance information and/or statistics information to the remote monitoring device, in response to a determination at the local control device of an elapse of a particular time interval;
- processing the transmitted performance information and/or statistics information at said remote monitoring device in response to receiving the transmitted performance information and/or statistics information to determine a service need condition associated with the transportation system, including determining at said remote monitoring device that a maintenance action is needed to perform maintenance on the transportation device; and
- selectively transmitting maintenance information associated with the service need condition to the local control device and/or a mobile service device in response to the determining the service need condition, including the determining at said remote monitoring device that the maintenance action is needed to perform maintenance on the transportation device.

12. The method of claim 11, further comprising:
managing a database at the local control device, the database storing data associated with the condition information and/or performance information.

13. The method of claim 11, wherein
the control board is connected to a main control board via an internal communication link, and
the control board is
implemented as a LON node and is configured to communicate with the local control device via LON interfaces, or
implemented as a drive node and is configured to communicate with the local control device via drive interfaces.

14. The method of claim 11, wherein the local control device is configured to communicate with the remote monitoring device via
SAG interfaces,
wireless interfaces, or
wired interfaces.

15. The method of claim 11, wherein the maintenance information indicates a particular kind and/or severity of failure or problem associated with a component of the transportation system.

16. The method of claim 15, further comprising:
transferring the maintenance information or making the maintenance information accessible to a remote maintenance center, the mobile service device, or the local control device of the transportation device, based on the particular kind and/or severity of failure or problem indicated by the maintenance information.

17. The method of claim 11, further comprising:
generating, at the mobile service device, a request to the remote monitoring device to retrieve specific condition information and/or performance information from a buffer at the local control device, the specific condition information and/or performance information associated with a specific service need condition; and
receiving, at the mobile service device, the specific condition information and/or performance information from the remote monitoring device.

18. A data carrier carrying data representing a software program that, when executed on a computer, realizes the method according to claim 11.

19. The data carrier of claim 18, wherein the computer is a distributed computing system part of a cloud computing system.

* * * * *